United States Patent Office 3,838,165
Patented Sept. 24, 1974

3,838,165
POLYFLUOROUREAS
Walter Blochl, Karlsruhe, Germany, assignor to FMC Corporation, New York, N.Y.
No Drawing. Continuation-in-part of abandoned application Ser. No. 830,849, June 5, 1969. This application July 10, 1972, Ser. No. 270,208
Int. Cl. C07d 49/30
U.S. Cl. 260—309.7
3 Claims

ABSTRACT OF THE DISCLOSURE

Hydroxymethylated derivatives of polyfluoroalkylureas are useful for imparting oil, water and crease resistance to fibrous substrates. The polyfluoroalkylureas have the formula:

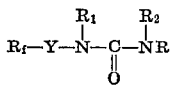

wherein $R_f$ is n-perfluoroalkyl group of 4–16 carbon atoms; Y is an alkylene bridge optionally interrupted with —O—, —S—, —SO—, —SO$_2$—, —SO$_2$NR'—, —CONR'—, —C(O)O—, and —NR'— wherein R' represents hydrogen, lower alkyl and -ureido; $R_1$ and $R_2$ are each hydrogen, lower alkyl or taken together can complete an imidozolidone or pyrimidone ring and R is hydrogen, lower alkyl, or $R_f$—Y—, it being provided that at least one urea nitrogen atom has hydrogen bonded thereto and it being further provided that the number of carbon atoms in Y is 2–12 for the non-interrupted bridge and 2–60 for the interrupted bridge.

---

This application is a continuation-in-part of Ser. No. 830,849, filed June 5, 1969, and now abandoned.

This invention pertains to the treatment of porous substrates, particularly fibrous materials. The invention is especially concerned with rendering textiles oil, water and crease resistant by treating them with certain hydroxymethylated polyfluoroalkylureas.

The treatment of porous substrates such as leather, wood, textiles and the like for the purpose of modifying their properties, is well known. In the textile field, for instance, it has long been the practice to apply wax or resinous coatings on cloth in order to increase its water repellency. Later, emulsion polymers were developed which not only imparted water repellency to textiles but also improved their oil and stain repellency. The drawback of such materials is that they are eventually removed from the cloth after a few dry cleanings and/or launderings.

Also known are materials capable of actually reacting with the textile substrate, the co-called fiber reactive compounds, and these proved to be highly resistant to removal by ordinary cleaning procedures. A class of fiber reactive compounds which has attracted considerable interest are the hydroxymethylated ureas. When applied to textile materials followed by heat curing in situ, such urea derivatives impart excellent wrinkle resistance to the fabric substrate. However, the hydroxymethylated ureas thus far reported do not significantly increase and in some instances may even decrease the soil and oil repellency of textiles.

Manifestly, there is a need for a class of hydroxymethylated ureas capable of imparting both crease resistance and oil and soil repellency to textile materials.

It has now been discovered that the above recited properties are possessed to a remarkable extent by the hydroxymethylated or etherified derivatives of certain polyfluoroureas, the formula of which is

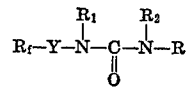

wherein $R_f$ is n-perfluoroalkyl group of 4–16 carbon atoms; Y is an alkylene bridge optionally interrupted with —O—, —S—, —SO—, —SO$_2$—, —SO$_2$NR'—, —CONR'—, —C(O)O—, and —NR'— wherein R' represents hydrogen, lower alkyl and -ureido; $R_1$ and $R_2$ are each hydrogen, lower alkyl or taken together can complete an imidozolidone or pyrimidone ring and R is hydrogen, lower alkyl, or $R_f$—Y—, it being provided that at least one urea nitrogen atom has hydrogen bonded thereto and it being further provided that the number of carbon atoms in Y is 2–12 for the non-interrupted bridge and 2–60 for the interrupted bridge.

The polyfluoroalkyl ureas of the invention can be prepared using the known methods of synthesizing substituted ureas. In general, the requisite polyfluoroalkylamine,

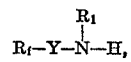

is reacted with a carbonyl derivative

wherein X and X' are halogens or amino groups. Illustrative carbonyl derivatives are (a) <br>(b) <br>(c)

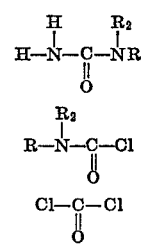

Exemplary reactions are depicted in the following schematic equations:

(1)

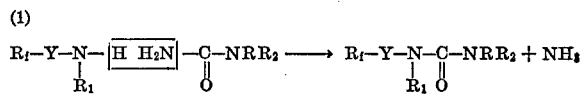

(2)

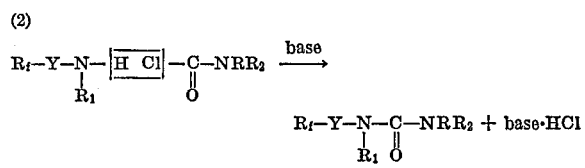

(3)

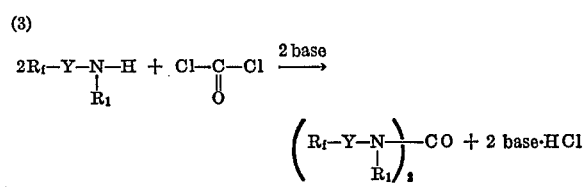

(4)

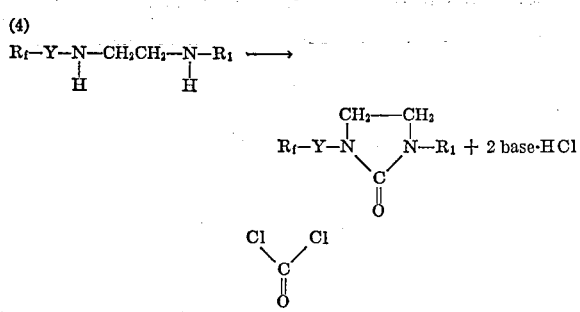

Reaction (1) is conveniently performed by heating stoichiometric amounts of the reactants until evolution of ammonia has ceased. Temperatures in the neighborhood of 150° C. are usually sufficient. Reactions (2), (3) and (4) tend to be somewhat exothermic and normally require some external cooling to prevent their becoming too vigorous. The use of inert solvents such as saturated or aromatic hydrocarbons are also effective in moderating the reactions. Once the initial exothermic reaction has subsided, it may require heating to effect its completion.

Suitable bases are the usual type of acid acceptors such as teritary organic bases, e.g. pyridine, trimethylamine, triethylamine, etc., the mineral bases, e.g. alkali metal carbonates, e.g. sodium or potassium carbonate and the like.

Where Y in the formula is a non-interrupted alkylene bridge, the requisite polyfluoroalkylamine is obtained by reacting a polyfluoroalkyl iodide $R_f(CH_2)_nI$ where $n$ is 1–12 with ammonia or a monofunctional primary or secondary amine having the desired substituents. The reaction is carried out in the known manner of alkylating amines. Typically, stoichiometric amounts of an amine having at least one amino hydrogen and the desired fluorinated iodide, $R_f(CH_2)_nI$ are heated at mildly elevated temperatures, usually in the presence of an inert solvent. The resulting polyfluoroalkylamine is isolated by distillation or crystallization or by other procedures known to the art.

Where Y in the formula is a hetero interrupted bridge, the requisite polyfluoroalkylamines can be realized using any number of preparative procedures. For instance, where the hetero atom is oxygen or a combination of oxygen and nitrogen, a polyfluoroalkanol,

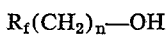

is condensed with ethyleneimine as follows:

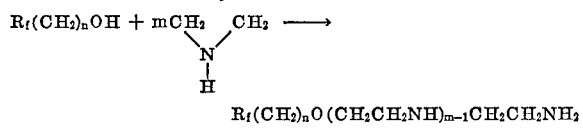

where $m$ is a whole number of 1 to 4. Or the polyfluoroalkanol can first be reacted with ethylene oxide and then with ethylene imine. By replacing the polyfluoroalkanol with the analogous thiol, there is obtained the corresponding sulfur interrupted alkylene bridge. Moreover, the S can be oxidized to produce a sulfoxide, —SO—, or sulfone, —SO$_2$—, linkage.

Polyfluoroalkanols and thiols are known compounds which are disclosed in the literature.

As previously pointed out, the fluorinated ureas herein are converted to their methylolated derivative prior to being applied to the fabric substrate. The reaction is generally carried out in a known manner of methylolating urea derivatives under alkaline conditions, using aqueous formaldehyde. In a typical procedure, 1.5 to 4 moles of formaldehyde in the form of a 37% aqueous solution is reacted with 1 mole of the urea compound at a pH of about 7–9 by heating the components for about 2 hours. Sodium hydroxide solution is used to adjust the pH. After the reaction is completed, neutralization to pH 7 results in a stable solution containing the hydroxymethylated polyfluoroalkylurea impregnating agent. The reaction mixture can be diluted to the desired strength for impregnating fibrous substrates without isolating and purifying the product.

Where the polyfluoroalkylureas are applied to the fabric from an organic solvent, it may be desirable to employ them in the form of their lower alkoxy methylated derivatives, which can be obtained by etherification of the methylol group with the lower alkanols such as methyl, ethyl, n-propyl, isopropyl, n-butyl, isobutyl alcohol or similar lower alkanols. Accordingly, it is to be understood herein that when speaking of methylolated derivatives of the polyfluoroalkylureas of subject invention, such derivatives include alkoxy methylated derivatives.

In accordance with the invention, the polyfluoroalkylurea is applied to textiles and similar fibrous substrates from aqueous solution by padding, spraying, dipping or the like. Preferably the concentration of the fluorinated urea is from about 0.2 to about 3.0%, although concentrations in the range of 0.1 to 5% are also satisfactory. Zinc nitrate, magnesium chloride, ammonium chloride, zirconium oxychloride, basic zirconium acetate, zirconium acetylacetonate complexes,

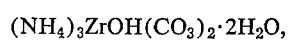

or other catalysts commonly employed to cure methylolated ureas on textile substrates, are useful for curing the fluorinated ureas. The treated substrates are dried at 100° C. for several minutes and cured by heating several minutes at 110° to 180° C. A convenient curing procedure consists in heating the treated fabric from about 1 to 5 minutes at 130° C. to 160° C. The impregnating bath may contain supplementary components such as flame retardants, non-fluorinated ureas for added crease-proofing, hand modifiers, lubricants, etc.

I have found it especially advantageous to incorporate zirconium compounds in the impregnating baths containing the fluorinated ureas of the invention. Thus, the use of zirconium compounds in concentrations of about 0.1% to about 3.0% applied to the textiles before, during or after the treatment increases the durability to laundering to a marked degree. Zirconium oxychloride, basic zirconium acetate, ammonium carbonate zirconate and zirconium chelates formed from triethanolamine, ammonium lactate or acetylacetonate are especially suitable in this connection. To a certain degree, titanium chelates can be used in lieu of the zirconium derivatives, although the latter are preferred.

Texiles impregnated in accordance with the invention have 3M oil repellency values of between 90 and 120. If compounds with 8 to 14 carbon atoms in the perfluoroalkyl radical are selected, an oil repellency value of 120 is obtained with 0.2% to 1% active material on the fabric. This value drops to no more than 100 to 110 after washing 5 times with a detergent in a household washing machine. The values of zirconized fabrics drop the least. The decrease after 5 dry cleanings amounts to only about 10 to 20 points.

In applying the compounds of the invention to textiles, samples of 80″ x 80″ cotton cloth are soaked in an aqueous isopropanol solution of the hydroxymethylated or etherified polyfluoroalkylurea containing magnesium chloride as curing agent. The pH of the solution is adjusted to 6 with hydrochloric acid. After soaking a few minutes, the cloth is removed from the bath, air dried and cured at about 155° C.

The invention is illustrated by the following nonlimiting examples:

EXAMPLE 1

The amine, n-C$_8$F$_{17}$CH$_2$CH$_2$NHC$_4$H$_9$-n ($n_D^{25}$ 1.3384), prepared from n-butylamine and n-C$_8$F$_{17}$CH$_2$CH$_2$I, is dissolved in a mixture of pyridine and anhydrous ether. The mixture is cooled in an ice bath and gradually added to a cold solution of carbamoyl chloride in ether. The mixture is stirred and allowed to warm up and then refluxed for about an hour and cooled. After filtration the urea is isolated by removal of the solvent.

Methylolation of $$n\text{-}C_8F_{17}CH_2CH_2N(C_4H_9\text{-}n)CONH_2.$$

A mixture of the urea in aqueous isopropanol is treated with 37% aqueous formaldehyde solution. The pH is adjusted to about 8 with aqueous sodium hydroxide. The mixture is heated several hours to complete the reaction.

EXAMPLE 2

$$n\text{-}C_8F_{17}CH_2CH_2SCH_2CH_2NHCONH_2$$

To a solution of sodium ethoxide, made from 0.75 g. of sodium and 60 ml. of absolute ethanol, is added 14.4 g. of n-$C_8F_{17}CH_2CH_2SH$ in 10 ml. of absolute ethanol. To this is added a solution of 3.7 g. β-chloroethylamine in absolute ethanol, prepared from the hydrochloride and alcoholic potassium hydroxide. The reaction is stirred and heated at 45° C. under nitrogen for several hours and then allowed to stand at room temperature overnight. From the reaction mixture is isolated 10.5 g. of $$n\text{-}C_8F_{17}CH_2CH_2SCH_2CH_2NH_2,$$

m.p. 40–42° C.

The amine n-$C_8F_{17}CH_2CH_2SCH_2CH_2NH_2$ and an excess of urea are heated together at 115° to 130° C. The product is washed with water and extracted with chloroform. Removal of the solvent affords solid $$n\text{-}C_8F_{17}CH_2CH_2SCH_2CH_2NHCONH_2.$$

Methylolation of $$n\text{-}C_8F_{17}CH_2CH_2SCH_2CH_2NHCONH_2.$$

A mixture of the aforesaid urea in aqueous isopropanol is treated with 37% aqueous formaldehyde solution. The pH is adjusted to about 8 with aqueous sodium hydroxide. The mixture is heated several hours to complete the reaction.

EXAMPLE 3

$$n\text{-}C_8F_{17}CH_2CH_2SO_2NHCH_2CH_2NHCONH_2$$

A mixture of 86 g. of n-$C_8F_{17}CH_2CH_2I$, 13.7 g. of thiourea and 150 ml. of 95% ethyl alcohol is stirred and refluxed for nine hours. The solvent is removed affording 98 g. of isothiouronium salt. The salt is dissolved in a mixture of 800 ml. each of warm acetic acid and water and then cooled to 10° C. Chlorine is bubbled into the mixture for one hour at 10° C. The mixture is stirred for one additional hour and the product $$n\text{-}C_8F_{17}CH_2CH_2SO_2Cl$$

collected by filtration, m.p. 62–64° C.

To a mixture of 0.05 mole of $$n\text{-}C_8F_{17}CH_2CH_2SO_2Cl$$

aforesaid in tetrahydrofuran is added 0.1 mole of ethylene diamine. The mixture is stirred and warmed to complete the reaction. The mixture is filtered and the solvent removed to give the crystalline amine, $$n\text{-}C_8F_{17}CH_2CH_2SO_2NHCH_2CH_2NH_2.$$

A mixture of $$n\text{-}C_8F_{17}CH_2CH_2SO_2NHCH_2CH_2NH_2,$$

pyridine and ether is cooled in an ice bath. To the mixture is added dropwise an ether solution of carbamoyl chloride with stirring. After the addition the reaction mixture is stirred and allowed to warm up to room temperature. The mixture is refluxed for a few minutes. After removal of the pyridine hydrochloride by filtration and the solvent by stripping, the crude urea, $$n\text{-}C_8F_{17}CH_2CH_2SO_2NHCH_2CH_2NHCONH_2,$$

is isolated in satisfactory yield.

Methylolation of $$n\text{-}C_8F_{17}CH_2CH_2SO_2NHCH_2CH_2NHCONH_2.$$

An aqueous isopropyl alcohol solution of the urea is reacted with aqueous 37% formaldehyde solution. The pH is adjusted to about 8 and the mixture is heated several hours.

EXAMPLE 4

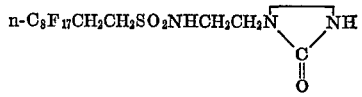

1-(β-Aminoethyl)-2-imidazolidone is added to a well stirred mixture of n-$C_8F_{17}CH_2CH_2SO_2Cl$, finely powdered and anhydrous potassium carbonate in anhydrous tetrahydrofuran. The mixture is refluxed for several hours to complete the reaction. The inorganic materials are removed by filtration and the imidazolidone isolated by removal of solvent.

Methylolation of

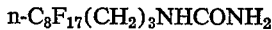

Methylolation is carried out as usual in aqueous isopropyl alcohol solution at a pH of about 8 using aqueous formaldehyde solution.

EXAMPLE 5

$$n\text{-}C_8F_{17}(CH_2)_3NHCONH_2$$

A mixture of 110 g. of n-perfluorooctyl iodide and 20 g. of allylurea is heated to 90° C. with stirring. Azobis(isobutyronitrile) (0.2 g.) is added and the reaction becomes exothermic. After 1½ hours the reaction is complete. The solid product is finely divided and washed with 1,1,2-trichlorotrifluoroethane. Seventy-four grams of the urea $$n\text{-}C_8F_{17}CH_2CHICH_2NHCONH_2$$

is obtained, m.p. 140° C.

A mixture of 47 g. of $$n\text{-}C_8F_{17}CH_2CHICH_2NHCONH_2,$$

5 g. of 5% Pd/C (palladium/charcoal catalyst), 5.9 g. of powdered, anhydrous potassium carbonate and 200 ml. of absolute alcohol is hydrogenated in a Paar shaker overnight. After removal of the catalyst and inorganic materials, the alcohol is evaporated. The solids are washed with dilute sodium hydroxide and water and then dried to obtain 24.4 g. of the desired urea, m.p. 134° C.

Methylolation of n-$C_8F_{17}CH_2CH_2CH_2NHCONH_2$

A mixture of the urea in aqueous isopropanol is treated with 37% aqueous formaldehyde solution. The pH is adjusted to about 8 with aqueous sodium hydroxide. The mixture is heated several hours to complete the reaction.

EXAMPLE 6

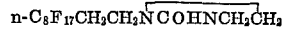

The diamine, n-$C_8F_{17}CH_2CH_2NHCH_2CH_2NH_2$ ($n_D^{25}$ 1.3438), 0.1 mole, prepared from $C_8F_{17}CH_2CH_2I$ and excess ethylenediamine, is dissolved in anhydrous ether containing 0.21 mole of pyridine. The mixture is cooled in an ice bath and stirred. Phosgene is slowly added until approximately ten grams have been added. The mixture is stirred one hour further and then allowed to warm up to room temperature. After refluxing for 1½ hours, the mixture is filtered to remove the pyridine hydrochloride. The ether solution is washed with sodium bicarbonate solution and water. After drying and removal of the solvent, the imidazolidone is obtained as a crystalline product in good yield.

Methylolation of

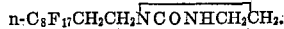

A mixture of the imidazolidone in aqueous isopropanol is treated with 37% aqueous formaldehyde solution. The pH is adjusted to about 8 with aqueous sodium hydroxide. The mixture is heated several hours to complete the reaction.

EXAMPLE 7 n-C$_8$F$_{17}$CH$_2$CH$_2$N(CONH$_2$)CH$_2$CH$_2$NHCONH$_2$

A solution of 0.04 mole of the diamine, n-C$_8$F$_{17}$CH$_2$CH$_2$NHCH$_2$CH$_2$NH$_2$, in 25 ml. of benzene is added slowly with cooling to a solution of 1.96 g. (0.01 mole) of silicon tetraisocyanate in 60 ml. of benzene. After the addition the mixutre is refluxed for 45 minutes. The benzene is removed under vacuum and is replaced by 60 ml. of isopropyl alcohol and 5 ml. of water. The mixture is refluxed for about 30–40 minutes and filtered hot to remove the gelatinous silica. The silica is washed with hot acetone several times. The desired diurea is obtained in good yield from the filtrate by precipitation with addition of water.

Methylolation of n-C$_8$F$_{17}$CH$_2$CH$_2$N(CONH$_2$)CH$_2$CH$_2$NHCONH$_2$

A mixture of the diurea aforesaid in aqueous isopropanol is treated with excess 37% aqueous formaldehyde solution. The pH is adjusted to about 8 with aqueous sodium hydroxide. The mixture is heated several hours to complete the reaction.

What is claimed is:

1. A polyfluoroalkylurea of the formula:

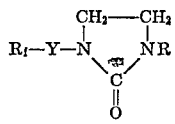

wherein R$_f$ is a n-perfluoroalkyl group of 4–16 carbon atoms; Y is

—CH$_2$CH$_2$SCH$_2$CH$_2$—, —CH$_2$CH$_2$SO$_2$NHCH$_2$CH$_2$—,

—CH$_2$CH$_2$—, —CH$_2$CH$_2$CH$_2$— and R is H or lower alkyl.

2. A polyfluoroalkylurea according to claim 1 and having the formula

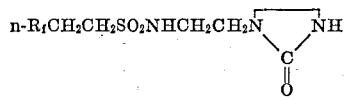

3. A polyfluoroalkylurea according to claim 1 and having the formula

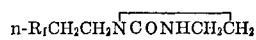

References Cited

UNITED STATES PATENTS 3,398,182    8/1968    Guenthner _____ 260—455

NATALIE TROUSOF, Primary Examiner

M. A. M. CROWDER, Assistant Examiner

U.S. Cl. X.R.

117—121; 260—251 R, 256.5, 553